United States Patent
Yu

(10) Patent No.: US 9,297,966 B1
(45) Date of Patent: Mar. 29, 2016

(54) OPTICAL FIBER CONNECTOR

(71) Applicant: BAYCOM OPTO-ELECTRONICS TECHNOLOGY CO., LTD., Hsinchu (TW)

(72) Inventor: Chien-Feng Yu, Hsin-Chu (TW)

(73) Assignee: BAYCOM OPTO-ELECTRONICS TECHNOLOGY CO., LTD., Hsinchu (TW)

( * ) Notice: Subject to any disclaimer, the term of this patent is extended or adjusted under 35 U.S.C. 154(b) by 0 days.

(21) Appl. No.: 14/681,059

(22) Filed: Apr. 7, 2015

(30) Foreign Application Priority Data

Jan. 27, 2015 (TW) .............................. 104201254 U

(51) Int. Cl.
*G02B 6/38* (2006.01)

(52) U.S. Cl.
CPC .............. *G02B 6/3893* (2013.01); *G02B 6/389* (2013.01); *G02B 6/3849* (2013.01)

(58) Field of Classification Search
CPC ..... G02B 6/3849; G02B 6/389; G02B 6/3893
USPC ......................................... 385/59, 60, 75, 78
See application file for complete search history.

(56) References Cited

U.S. PATENT DOCUMENTS

| 8,070,367 B2 * | 12/2011 | Winberg | G02B 6/3846 385/55 |
| 8,915,655 B2 | 12/2014 | Yu et al. | |
| 2013/0188913 A1 * | 7/2013 | Yu | G02B 6/36 385/76 |

* cited by examiner

*Primary Examiner* — Ryan Lepisto
(74) *Attorney, Agent, or Firm* — CKC & Partners Co., Ltd.

(57) ABSTRACT

An optical fiber connector includes a front fastening part, a rear fastening part engaged with the front fastening part, and a joint portion disposed between the front fastening part and the rear fastening part. The front fastening part includes a first through-penetrating passageway and an elastic engaging member coupled with the front fastening part. The rear fastening part includes a second through-penetrating passageway and an elastic pressing element monolithically connected to the rear fastening part and abutting against the elastic engaging member. The joint portion is disposed in both of the first through-penetrating passageway and the second through-penetrating passageway, and engaged with the front fastening part and the rear fastening part. The joint portion is provided with a third through-penetrating passageway mutually communicating with the second through-penetrating passageway and the first through-penetrating passageway for accommodating at least one optical fiber therein.

9 Claims, 4 Drawing Sheets

OPTICAL FIBER CONNECTOR

RELATED APPLICATIONS

This application claims priority to Taiwan Application Serial Number 104201254, filed Jan. 27, 2015, which is herein incorporated by reference.

BACKGROUND

1. Field of Disclosure

The present disclosure relates to a connector. More particularly, the present disclosure relates to an optical fiber connector.

2. Description of Related Art

The current optical communication technology can provide huge and rapid transmission of information, and thus applications of the optical communication technology have become increasingly popular. In the applications of the optical communication technology, an optical transceiver is connected to in-line equipment and fiber optic equipment so as to assist the in-line equipment to normally use optical fibers of the fiber optic equipment. Since the optical fibers are made of plastic, glass or other non-metallic materials, each of the optical fibers has some advantages, such as anti-electromagnetic, anti-noise interference, high bandwidth, lightweight, long distance and good confidentiality of signal transmission, so that traditional metal transmission lines have been gradually replaced by the optical fibers.

Recently, with the development of fiber optic networks, in order to connect the optical fibers with any kind of electrical devices for transmitting information to the electrical device, an optical fiber connector is used for extending a path length of two different optical fibers or connecting two different optical fibers. The optical fiber connector is a mechanical device that is assembled at a distal end of an optical fiber, and can be used as a connecting element for extending the optical fiber path.

Generally, when desiring to release the optical fiber connector from a fiber connecting port of an optical fiber terminal, a user needs to press a press portion of the optical fiber connector so as to withdraw the optical fiber connector from the fiber connecting port after the optical fiber connector is disengaged with the connecting port.

However, because the press portion is coupled to the optical fiber connector in a mechanical manner, the connection strength between the pressing portion and the optical fiber connector is not strong and the press portion is likely to be detached from the optical fiber connector due to the shaking thereof. In addition, because of vigorous market competition, industry vendors are all dedicated to reducing costs and increasing profits for enhancing their market competitiveness. However, as the quantity of parts of the optical fiber connector increases, it will be difficult to reduce assembly hours and material preparation cost of the optical fiber connector.

In view of the above, the aforementioned inconvenience and shortages obviously exist and need to be further improved. Therefore, how to effectively overcome the aforementioned inconvenience and shortages and to increase the competitiveness of industries shall be seriously concerned.

SUMMARY

One aspect of the disclosure is to provide an optical fiber connector to overcome the defects and inconvenience of the prior art.

For achieving the aforementioned object, according to one or more embodiments of this disclosure, an optical fiber connector includes at least one front fastening part, a rear fastening part and at least one joint portion. The front fastening part comprises a first main body, a first through-penetrating passageway penetrating through the first main body, and an elastic engaging member inclinedly coupled with the first main body. The rear fastening part comprises a second main body engaged with the first main body, at least one second through-penetrating passageway penetrating through the second main body, and an elastic pressing element monolithically connected to the second main body and abutting against the elastic engaging member. The joint portion is disposed between the first main body and the second main body, received in both of the first through-penetrating passageway and the second through-penetrating passageway, and engaged with the first main body and the second main body. The joint portion is provided with a third through-penetrating passageway mutually communicated with the second through-penetrating passageway and the first through-penetrating passageway for accommodating at least one optical fiber therein.

In the above embodiment, the elastic pressing element is monolithically formed with the rear fastening part, and thus, when the elastic pressing element is operated to press the elastic engaging member, compared to the prior art, because the elastic pressing element has stronger structural strength, the elastic pressing element can provide more stable operational endurance, such that the operation life of the optical fiber connector can be increased. Furthermore, since the elastic pressing element is monolithically formed with the rear fastening part, the complexity of the integral structure of the optical fiber connector is simplified, and the quantity of the parts of the optical fiber connector is decreased. Thus, the assembly hours, the production costs and the material preparation cost of the optical fiber connector are therefore reduced and the market competitiveness is enhanced.

According to one or more embodiments of this disclosure, the elastic engaging member is monolithically connected to the first main body.

According to one or more embodiments of this disclosure, the joint portion comprises two first engaging blocks which are arranged oppositely, and two second engaging blocks which are arranged oppositely. The first main body is provided with two first engaging openings which are arranged oppositely, and the first engaging openings are connected with the first through-penetrating passageway. The second main body is provided with two second engaging openings which are arranged oppositely, and the second engaging openings communicate with the second through-penetrating passageway. Through the first engaging blocks respectively engaged with the first engaging openings, and the second engaging blocks respectively engaged with the second engaging openings, the joint portion is engaged with the first main body and the second main body.

According to one or more embodiments of this disclosure, the first engaging blocks are different in size, and one of the first engaging blocks fits one of the first engaging openings, but does not fit the other of the first engaging openings.

According to one or more embodiments of this disclosure, the second engaging blocks are different in size, and one of the second engaging blocks fits one of the second engaging openings, but does not fit the other of the second engaging openings.

According to one or more embodiments of this disclosure, each of the first engaging blocks is in a wedge shape, and is provided with a first engaging face; each of the second engaging blocks is in a wedge shape, and is provided with a second engaging face. One of the first engaging faces and one of the second engaging faces which are located on the same side of the joint portion face towards each other.

According to one or more embodiments of this disclosure, a surface of the first main body is formed with a groove, and the groove is formed between the first engaging openings so as to divide the surface of the first main body into two halves. When the second main body is engaged with the first main body, to press the halves towards the groove to approach to each other, the first engaging blocks respectively extend into the corresponding first engaging openings from the first through-penetrating passageway.

According to one or more embodiments of this disclosure, the optical fiber connector further comprises at least one optical fiber-protective sleeve, at least one spring and at least one optical fiber core. The optical fiber-protective sleeve is disposed in the first through-penetrating passageway, the second through-penetrating passageway and the third through-penetrating passageway. The spring is disposed in the third through-penetrating passageway. The optical fiber core is disposed in the optical fiber-protective sleeve, and coupled with the spring for receiving the optical fiber.

According to one or more embodiments of this disclosure, the optical fiber connector comprises at least one dust jacket. The dust jacket covers one end of the first through-penetrating passageway of the front fastening part away from the rear fastening part.

According to one or more embodiments of this disclosure, the number of the second through-penetrating passageway is two, and the second through-penetrating passageways are arranged abreast, the number of the front fastening part is two, the number of the joint portion is two. Each of the joint portions is received and engaged in one of the first through-penetrating passageways and one of the second through-penetrating passageways, the elastic pressing element abuts against both of the elastic engaging members.

It is to be understood that both the foregoing general description and the following detailed description are by examples, and are intended to provide further explanation of the disclosure as claimed.

BRIEF DESCRIPTION OF THE DRAWINGS

The disclosure may be more fully understood by reading the following detailed description of the embodiment, with reference made to the accompanying drawings as follows.

DESCRIPTION OF THE EMBODIMENTS

Figure 1:
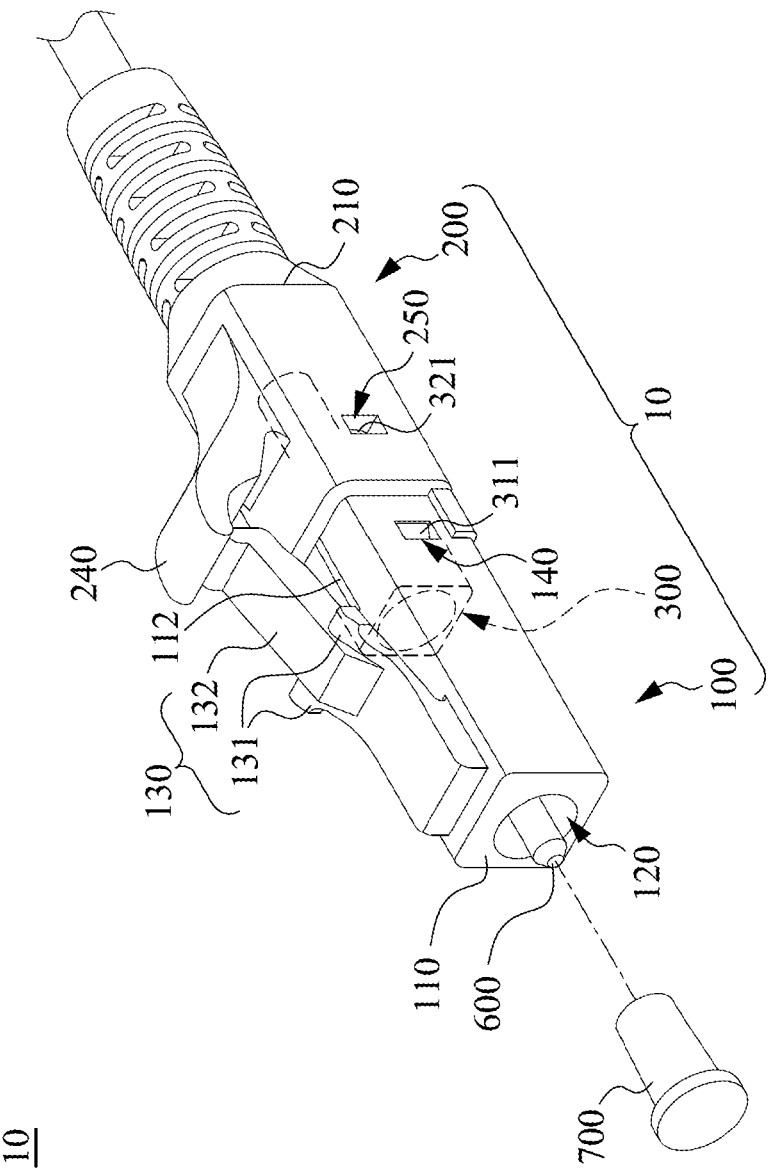
FIG. 1 is a perspective view of an optical fiber connector according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the present disclosure without departing from the scope or spirit of the disclosure.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

Figure 2:
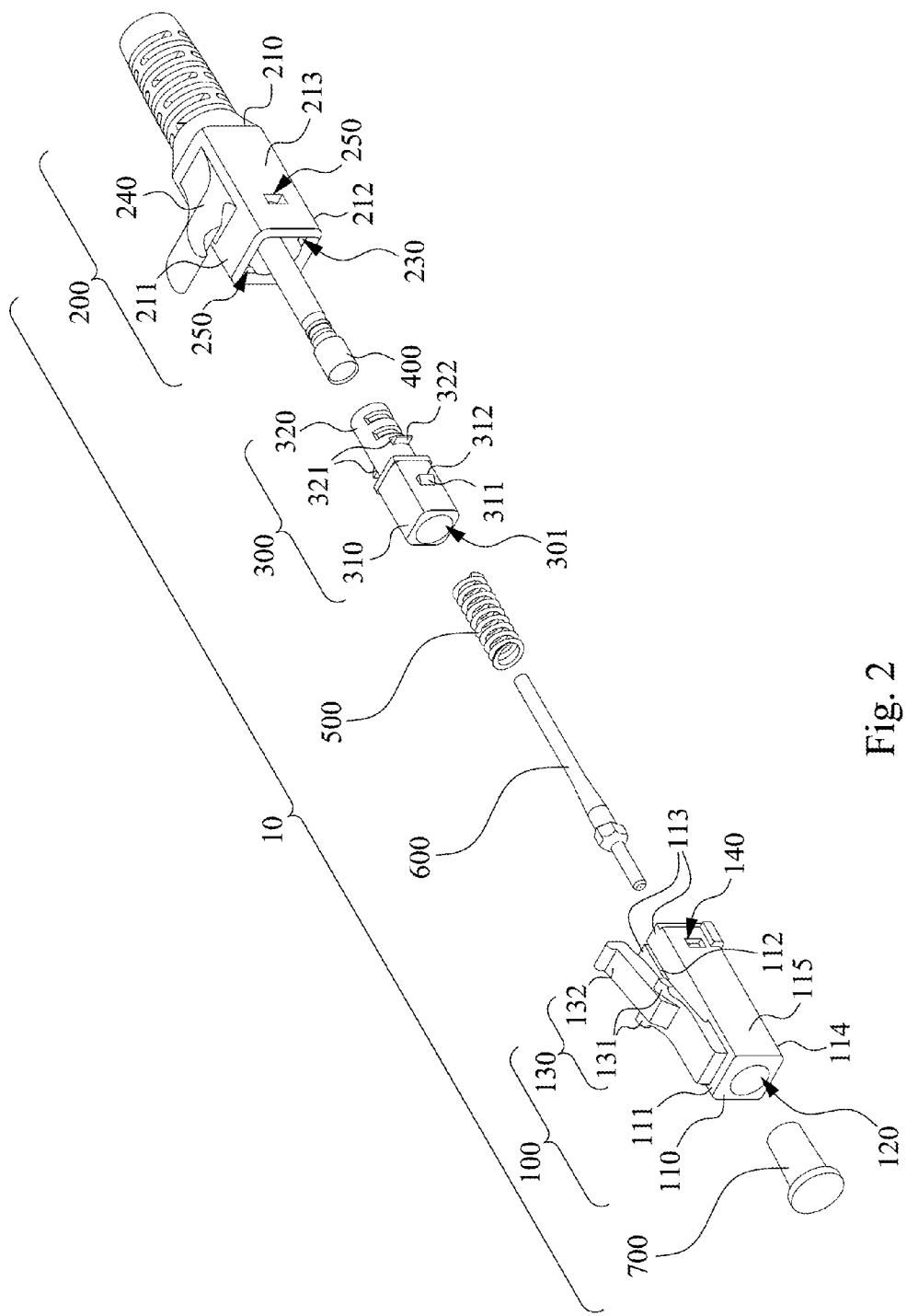
FIG. 2 is an exploded perspective view of FIG. 1.

FIG. 1 is a perspective view of an optical fiber connector according to an embodiment of the disclosure, and FIG. 2 is an exploded perspective view of FIG. 1. As shown in FIG. 1 and FIG. 2, according to the embodiment, the optical fiber connector 10 includes a front fastening part 100, a rear fastening part 200 and a joint portion 300. The front fastening part 100 includes a first main body 110, a first through-penetrating passageway 120 and an elastic engaging member 130. The first main body 110 is shaped as a column. The first through-penetrating passageway 120 axially penetrates the first main body 110. The elastic engaging member 130 is inclinedly coupled with the first main body 110, in which one end of the elastic engaging member 130 is connected to a surface of the first main body 110, and the other end of the elastic engaging member 130 is a free-end, and is oblique to be away from the surface of the first main body 110. The rear fastening part 200 includes a second main body 210, a second through-penetrating passageway 230 and an elastic pressing element 240. The second main body 210 is shaped as a column. The second through-penetrating passageway 230 axially penetrates the second main body 210. The elastic pressing element 240 is monolithically formed with and on a surface of the second main body 210. Specifically, one end of the elastic pressing element 240 is monolithically formed on the surface of the second main body 210, and the other end of the elastic pressing element 240 is a free-end, and is oblique to be away from the surface of the second main body 210 to abut against the other end of elastic engaging member 130. The joint portion 300 is disposed between the first main body 110 and the second main body 210, contained within both of the first through-penetrating passageway 120 and the second through-penetrating passageway 230, and respectively fixedly secured with the first main body 110 and the second main body 210 so as to allow an optical fiber (not shown in figures) to extend into the second main body 210, the joint portion 300 and the first main body 110 in sequence.

Therefore, since the elastic pressing element 240 is monolithically formed on the rear fastening part 200, thus, when the elastic pressing element 240 is operated to press the elastic engaging member 130, because the elastic pressing element 240 has stronger structural strength, the elastic pressing element 240 can provide more stable operational endurance so as to increase the operational life of the optical fiber connector 10. Furthermore, since the elastic pressing element 240 is monolithically formed on the rear fastening part 200, the complexity of the integral structure of the optical fiber connector 10 is simplified, and the quantity of the parts of the optical fiber connector 10 is decreased. Thus, the assembly hours, the production costs and the material preparation cost of the optical fiber connector are therefore reduced so as to enhance the competitiveness of the market.

In this embodiment, more particularly, the joint portion 300 includes a first portion 310, a second portion 320, two first engaging blocks 311 and two second engaging blocks 321. One end of the first portion 310 is connected to one end of the second portion 320. The first engaging blocks 311 are respectively arranged on two opposite sides of the first portion 310. The second engaging blocks 321 are respectively arranged on two opposite sides of the second portion 320. The first main body 110 is provided with a first top surface 111, a first bottom surface 114 and two first side surfaces 115. The first top surface 111 and the first bottom surface 114 are oppositely arranged, and the first side surfaces 115 are oppositely arranged. Each of the first side surfaces 115 is connected to the first top surface 111 and the first bottom surface 114, and is arranged between the first top surface 111 and the first bottom surface 114. The first main body 110 is further provided with two first engaging openings 140. The first engaging openings 140 are oppositely and concavely formed on the first side surfaces 115 of the first main body 110, respectively, and the first engaging openings 140 are connected with the first through-penetrating passageway 120. The elastic engaging member 130 is monolithically formed on the first top surface 111 of the first main body 110. However, the disclosure is not limited thereto, that is, the elastic engaging member also can be assembled at one surface of the first main body, and is not necessary to be monolithically formed with and on the front fastening part. The second main body 210 is provided with a second top surface 211, a second bottom surface 212 and two second side surfaces 213. The second top surface 211 and the second bottom surface 212 are oppositely arranged, and the second side surfaces 213 are oppositely arranged. Each of the second side surfaces 213 is connected to the second top surface 211 and the second bottom surface 212, and is arranged between the second top surface 211 and the second bottom surface 212. The elastic pressing element 240 is monolithically formed with and on the second top surface 211 of the second main body 210. The second main body 210 is further provided with two second engaging openings 250. The second engaging openings 250 are oppositely and concavely formed on the second side surfaces 213 of the second main body 210, respectively, and the second engaging openings 250 are connected with the second through-penetrating passageway 230. Thus, when the joint portion 300 is assembled with the front fastening part 100 and the rear fastening part 200, since the first engaging blocks 311 respectively engaged with the first engaging openings 140, e.g., the first engaging blocks 311 respectively extend into the corresponding first engaging openings 140 from the first through-penetrating passageway 120, thus, the first portion 310 of the joint portion 300 is engaged in the first through-penetrating passageway 120 of the first main body 110. At the same moment, since the second engaging blocks 321 respectively are engaged with the second engaging openings 250, e.g., the second engaging blocks 321 respectively extend into the corresponding second engaging openings 250 from the second through-penetrating passageway 230, thus, the second portion 320 of the joint portion 300 is engaged in the second through-penetrating passageway 230 of the second main body 210.

In one variation of the embodiment, the first engaging blocks 311 and the second engaging blocks 321 are respectively shaped as wedge shapes. In other words, each of the first engaging blocks 311 is provided with a first engaging face 312, and each of the second engaging blocks 321 is provided with a second engaging face 322. One of the first engaging faces 312 and one of the second engaging faces 322 which are located on the same side of the joint portion 300 face towards each other.

Therefore, when one of the first engaging blocks 311 and one of the first engaging openings 140 are respectively engaged with each other, the first engaging face 312 of the first engaging block 311 abuts the corresponding first engaging opening 140 so as to prevent the front fastening part 100 from detaching from the joint portion 300. Similarly, when one of the second engaging blocks 321 and one of the second engaging openings 250 are engaged with each other, the second engaging face 322 of the second engaging block 321 abuts the corresponding second engaging opening 250 so as to prevent the rear fastening part 200 from detaching from the joint portion 300.

In one variation of the embodiment, the front fastening part 100 and the joint portion 300 mutually have a fool-proof mechanism, so that the front fastening part 100 will not be assembled with the joint portion 300 reversely, so as to accelerate the speed of assembly. For example, the first engaging blocks 311 are different in size and the first engaging openings 140 are different in size, such that the right side of the first engaging block 311 is larger than the left side of the first engaging block 311 and the left side of the first engaging opening 140, and the right side of the first engaging opening 140 is larger than the left side of the first engaging opening 140. Thus, the right side of the first engaging block 311 only fits the right side of the first engaging opening 140 being located at the same side, but does not fit the left side of the first engaging opening 140 being located at the other side; that is, the right side of the first engaging block 311 is only allowed to be engaged with the right side of the first engaging opening 140 being located at the same side, but not allowed to be engaged with the left side of the first engaging opening 140 being located at the other side.

Similarly, the rear fastening part 200 and the joint portion 300 mutually have a fool-proof mechanism, so that the rear fastening part 200 will not be assembled with the joint portion 300 reversely, so as to accelerate the speed of assembly. For example, the second engaging blocks 321 are different in size and the second engaging openings 250 are different in size such that the right side of the second engaging block 321 is larger than the left side of the second engaging block 321 and the left side of the second engaging opening 250, and the right side of the second engaging opening 250 is larger than the left side of the second engaging opening 250. Thus, the right side of the second engaging block 321 only fits one of the second engaging openings 250 being located at the same side (i.e., right side thereof), but does not fit the other second engaging opening 250 being located at the other side (i.e., left-side thereof); that is, the right side of the second engaging block 321 is only allowed to be engaged with one of the second engaging openings 250 being located at the same side (i.e., right side thereof), but not allowed to be engaged with the other second engaging openings 250 being located at the other side (i.e., left side thereof).

Furthermore, the first top surface 111 of the first main body 110 is formed with a groove 112. The groove 112, for example, is shaped as a line, and is formed between the first engaging openings 140 to divide the first top surface 111 of the first main body 110 into two halves 113. Therefore, when the second main body 210 is engaged with the first main body 110 to press the halves 113 towards the groove 112 to approach to each other, the first engaging blocks 311 respectively extend into the corresponding first engaging openings 140 from the first through-penetrating passageway 120. Therefore, as long as the second main body 210 is engaged with the first main body 110, the first engaging blocks 311 will not be detached from the respective first engaging openings 140.

In the embodiment, the joint portion 300 has a third through-penetrating passageway 301 mutually communicating with the second through-penetrating passageway 230 and the first through-penetrating passageway 120. The optical fiber connector 10 further includes an optical fiber-protective sleeve 400, a spring 500 and an optical fiber core 600. The optical fiber-protective sleeve 400 is in a tubular shape, and is disposed in the first through-penetrating passageway 120, the second through-penetrating passageway 230 and the third through-penetrating passageway 301. The spring 500 is disposed in the third through-penetrating passageway 301. The optical fiber core 600 is coupled with and in the optical fiber-protective sleeve 400, and is engaged with the spring 500 for receiving the optical fiber (not shown in figures). Also, the optical fiber connector 10 includes a dust jacket 700. The dust jacket 700 covers one end of the first through-penetrating passageway 120 of the front fastening part 100 away from the rear fastening part 200, thereby preventing dust from entering the optical fiber connector 10 when the front fastening part 100 is not inserted into a fiber connecting interface (not shown in figures) yet.

Also, the elastic engaging member 130 is provided with two position-limiting blocks 131 and a pressing rib 132. The pressing rib 132 is disposed between the position-limiting blocks 131, and connected to the position-limiting blocks 131. One end of the pressing rib 132 opposite to the first main body 110 is a free end, and the free end is used to be pressed by one end of the elastic pressing element 240 opposite to the second main body 210. Therefore, when the front fastening part 100 is inserted into the fiber connecting interface (not shown in figures), the front fastening part 100 (i.e., the optical fiber connector 10) can be fixedly secured in the fiber connecting port (not shown in figures) due to the position-limiting blocks 131 being engaged with the fiber connecting interface (not shown in figures). On the contrary, when the elastic pressing element 240 is pushed to press the pressing rib 132 for moving the position-limiting blocks 131, the front fastening part 100 (i.e., the optical fiber connector 10) can be disengaged from the fiber connecting interface (not shown in figures).

Figure 3:
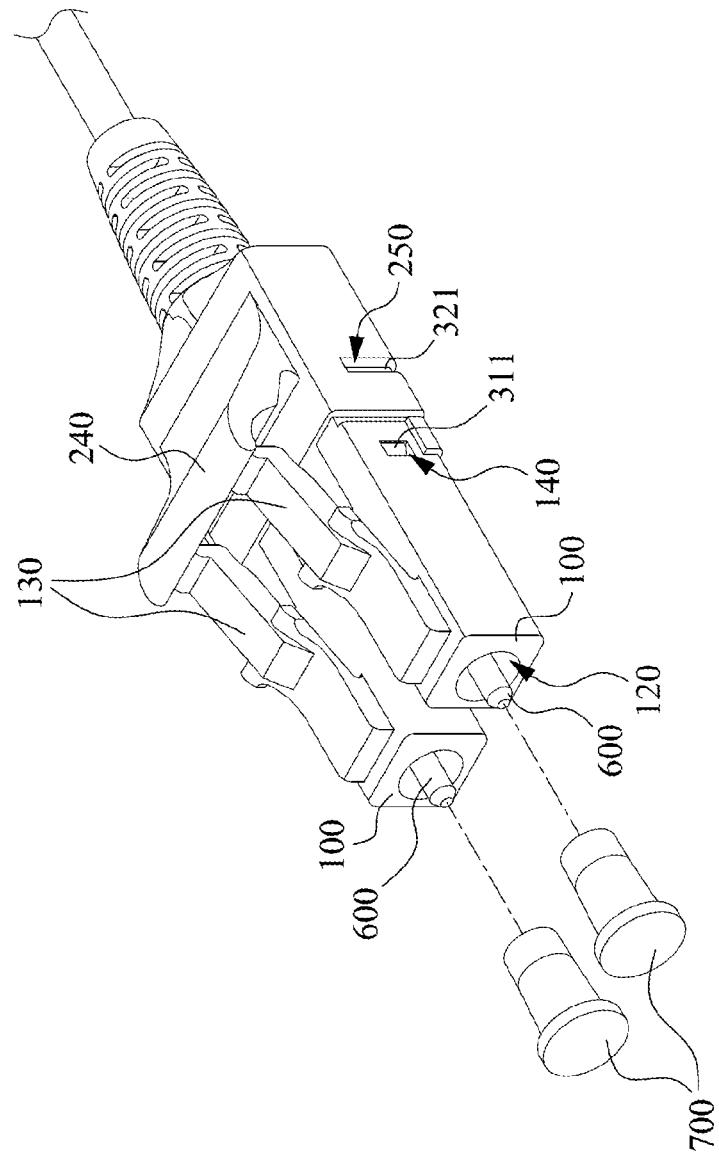
FIG. 3 is a perspective view of an optical fiber connector according to another embodiment of the disclosure.
Figure 4:
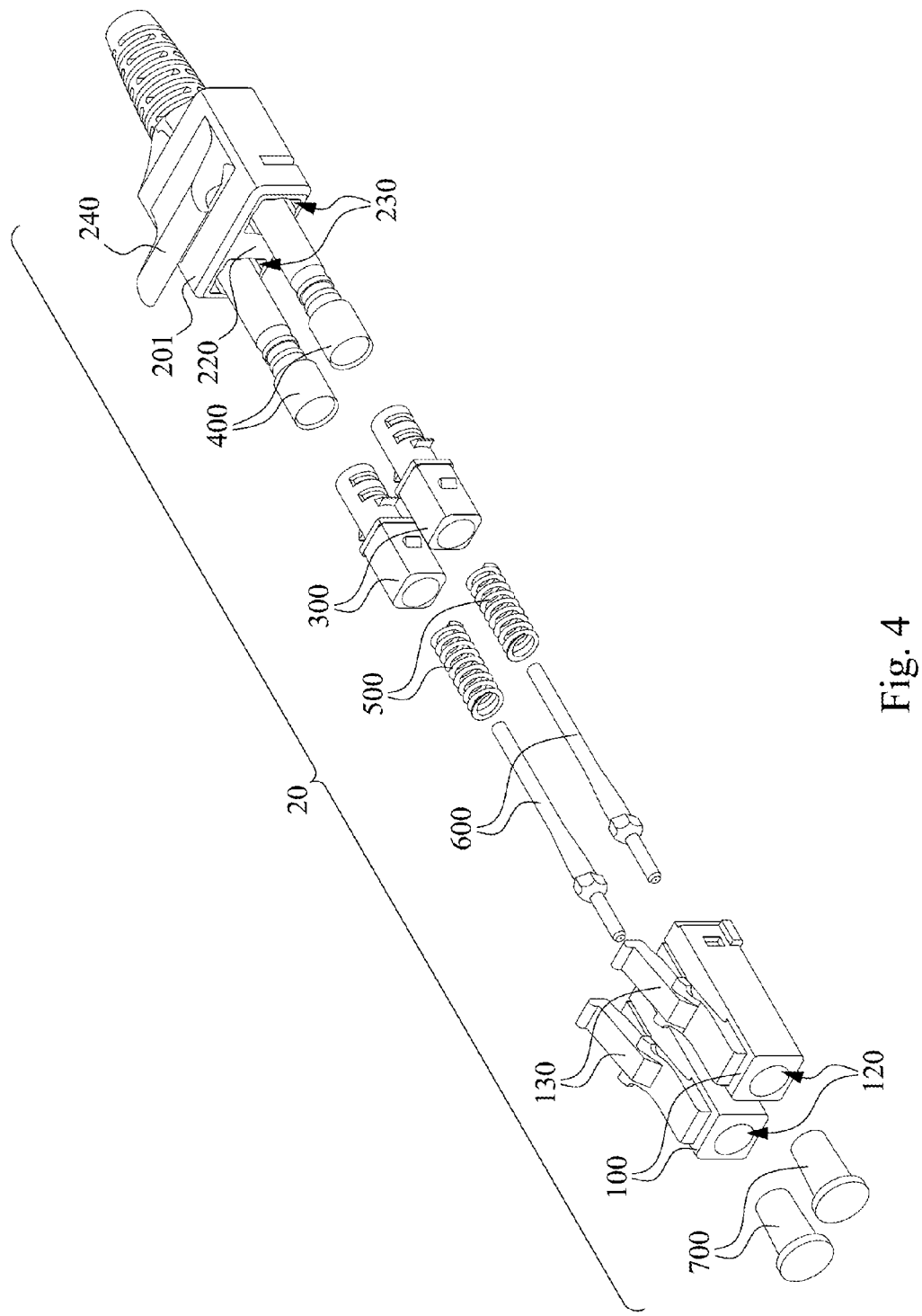
FIG. 4 is an exploded perspective view of FIG. 3.

FIG. 3 is a perspective view of an optical fiber connector according to another embodiment of the disclosure, and FIG. 4 is an exploded perspective view of FIG. 3. As shown in FIG. 3 and FIG. 4, the optical fiber connector 20 of another embodiment is substantially the same as the optical fiber connector 10 of the above embodiment except that the number of the second through-penetrating passageway 230, the optical fiber-protective sleeve 400, the joint portion 300, the spring 500, the optical fiber core 600 and the front fastening part 100 are plural (e.g., two), and the second through-penetrating passageways 230 are mutually arranged abreast, the optical fiber-protective sleeves 400 are mutually arranged abreast, the joint portions 300 are mutually arranged abreast, the springs 500 are mutually arranged abreast, the optical fiber cores 600 are mutually arranged abreast, and the front fastening parts 100 are mutually arranged abreast. Each of the joint portions 300 is received and fixedly secured within one of the first through-penetrating passageways 120 and one of the second through-penetrating passageways 230, the single elastic pressing element 240 of a single rear fastening part 201 abuts against both of the two elastic engaging members 130. Therefore, by using the single elastic pressing element 240 to press the two elastic engaging members 130, the optical fiber connector 20 can be rapidly removed outwardly.

In another embodiment, the single rear fastening part 201 further includes a separation member 220 disposed in the single rear fastening part 201 to form two second through-penetrating passageways 230. Two engaging openings (refer to the second engaging openings 250 in FIG. 2) are respectively formed on two opposite inner walls of the separation member 220. The engaging openings are connected to the second through-penetrating passageways 230 for being engaged with the engaging block of the corresponding joint portion 300.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of the disclosure provided they fall within the scope of the following claims and their equivalents.

What is claimed is:

1. An optical fiber connector, comprising:
   at least one front fastening part comprising a first main body, a first through-penetrating passageway penetrating through the first main body, and an elastic engaging member inclinedly coupled with the first main body, wherein the first main body is provided with two first engaging openings which are arranged oppositely, and the first engaging openings are connected with the first through-penetrating passageway;
   a rear fastening part comprising a second main body engaged with the first main body, at least one second through-penetrating passageway penetrating through the second main body, and an elastic pressing element monolithically connected to the second main body and abutting against the elastic engaging member, wherein the second main body is provided with two second engaging openings which are arranged oppositely, and the second engaging openings communicate with the second through-penetrating passageway; and
   at least one joint portion which is disposed between the first main body and the second main body, received in both of the first through-penetrating passageway and the second through-penetrating passageway, and engaged with the first main body and the second main body, the joint portion comprises two first engaging blocks which are arranged oppositely, and two second engaging blocks which are arranged oppositely,
   wherein the joint portion is provided with a third through-penetrating passageway mutually communicating with the second through-penetrating passageway and the first through-penetrating passageway for accommodating at least one optical fiber therein, and through the first engaging blocks respectively engaged with the first engaging openings, and the second engaging blocks respectively engaged with the second engaging openings, the joint portion is engaged with the first main body and the second main body.

2. The optical fiber connector of claim 1, wherein each of the first engaging blocks is in a wedge shape, and is provided with a first engaging face; each of the second engaging blocks is in a wedge shape, and is provided with a second engaging face, wherein one of the first engaging faces and one of the second engaging faces which are located on the same side of the joint portion face towards each other.

3. The optical fiber connector of claim 1, wherein the first engaging blocks are different in size, and one of the first engaging blocks fits one of the first engaging openings, but does not fit the other of the first engaging openings.

4. The optical fiber connector of claim 1, wherein the second engaging blocks are different in size, and one of the second engaging blocks fits one of the second engaging openings, but does not fit the other of the second engaging openings.

5. The optical fiber connector of claim 1, wherein a surface of the first main body is formed with a groove, and the groove is formed between the first engaging openings so as to divide the surface of the first main body into two halves,
   wherein, when the second main body is engaged with the first main body, to press the halves towards the groove to approach to each other, the first engaging blocks respectively extend into the corresponding first engaging openings from the first through-penetrating passageway.

6. The optical fiber connector of claim 1, further comprising:
- at least one optical fiber-protective sleeve disposed in the first through-penetrating passageway, the second through-penetrating passageway and the third through-penetrating passageway;
- at least one spring disposed in the third through-penetrating passageway; and
- at least one optical fiber core disposed in the optical fiber-protective sleeve, and coupled with the spring for receiving the optical fiber.

7. The optical fiber connector of claim 1, wherein the elastic engaging member is monolithically connected to the first main body.

8. The optical fiber connector of claim 1, comprising:
- at least one dust jacket covering one end of the first through-penetrating passageway of the front fastening part away from the rear fastening part.

9. The optical fiber connector of claim 1, wherein the number of the second through-penetrating passageway is two, and the second through-penetrating passageways are arranged abreast, the number of the front fastening part is two, the number of the joint portion is two,
- wherein each of the joint portions is received and engaged in one of the first through-penetrating passageways and one of the second through-penetrating passageways, the elastic pressing element abuts against both of the elastic engaging members.

* * * * *